US009635530B2

United States Patent
Ayyalasomayajula et al.

(10) Patent No.: US 9,635,530 B2
(45) Date of Patent: Apr. 25, 2017

(54) USER EQUIPMENT (UE) SUPPORTING PACKET-SWITCHED EMERGENCY CALLS OVER IP MULTIMEDIA SUBSYSTEM (IMS)

(71) Applicant: Intel IP Corporation, Santa Clara, CA (US)

(72) Inventors: Usharani Ayyalasomayajula, Bangalore (IN); Frank Kowalewski, Goettingen (DE); Muthaiah Venkatachalam, Beaverton, OR (US); Thomas Luetzenkirchen, Taufkirchen (DE)

(73) Assignee: Intel IP Corporation, Santa Clara, CA (US)

( * ) Notice: Subject to any disclaimer, the term of this patent is extended or adjusted under 35 U.S.C. 154(b) by 149 days.

(21) Appl. No.: 14/340,936

(22) Filed: Jul. 25, 2014

(65) Prior Publication Data

US 2015/0109965 A1 Apr. 23, 2015

Related U.S. Application Data

(60) Provisional application No. 61/893,792, filed on Oct. 21, 2013.

(51) Int. Cl.
*H04L 12/16* (2006.01)
*H04W 4/22* (2009.01)
(Continued)

(52) U.S. Cl.
CPC ............ *H04W 4/22* (2013.01); *H04L 1/1678* (2013.01); *H04L 5/14* (2013.01); *H04L 47/2466* (2013.01);
(Continued)

(58) Field of Classification Search
CPC .... H04W 4/22; H04W 88/08; H04L 65/1069; H04L 65/1016; H04L 4/2416; H04L 1/1607
(Continued)

(56) References Cited

U.S. PATENT DOCUMENTS

| 2002/0064164 A1* | 5/2002 | Barany | H04L 29/06 370/401 |
| 2004/0196868 A1* | 10/2004 | King | H04M 7/0069 370/468 |

(Continued)

FOREIGN PATENT DOCUMENTS

| CN | 105637972 A | 6/2016 |
| WO | WO-2015060977 A1 | 4/2015 |

OTHER PUBLICATIONS

3GPP TS 26.267 V10.0.0 (Mar. 2011); Technical Specification 3rd Generation Partnership Project; Technical Specification Group Services and System Aspects; eCall Data Transfer; In-band modem solution; General description (Release 10) Global System for; Mar. 2011.*

(Continued)

*Primary Examiner* — Faisal Choudhury
(74) *Attorney, Agent, or Firm* — Schwegman Lundberg & Woessner, P.A.

(57) ABSTRACT

Embodiments of a mobile device, a User Equipment (UE), and method for supporting emergency calls on a packet-switched network are generally described herein. In some embodiments, the UE may be configured to support emergency calls in accordance with a 3GPP protocol and with eCall in an IP Multimedia Subsystem (IMS) session. The UE may comprise hardware processing circuitry configured to transmit traffic packets to an Evolved Node-B (eNB) for forwarding to a receiving station, which may be a Public Safety Answer Point (PSAP). In some embodiments, the (Continued)

transmission of traffic packets during a packetization period may be restricted to one of transmission of voice packets or transmission of data packets. In some embodiments, at least some of the data packets may include Minimum Set of Emergency Related Data (MSD), and the IMS session may be configured in accordance with Real Time Transport Protocol (RTP).

30 Claims, 7 Drawing Sheets (51) Int. Cl.
| | | |
|---|---|---|
| H04L 29/06 | (2006.01) | |
| H04L 1/16 | (2006.01) | |
| H04L 5/14 | (2006.01) | |
| H04W 72/04 | (2009.01) | |
| H04W 92/02 | (2009.01) | |
| H04M 11/04 | (2006.01) | |
| H04W 28/02 | (2009.01) | |
| H04W 88/06 | (2009.01) | |
| H04W 8/08 | (2009.01) | |
| H04W 36/00 | (2009.01) | |
| H04W 64/00 | (2009.01) | |
| H04W 76/00 | (2009.01) | |
| H04L 12/855 | (2013.01) | |
| H04L 12/859 | (2013.01) | |
| H04L 12/841 | (2013.01) | |
| H04W 84/04 | (2009.01) | |
| H04W 84/12 | (2009.01) | |
| H04W 88/08 | (2009.01) | |

(52) U.S. Cl.
CPC .......... *H04L 47/2475* (2013.01); *H04L 47/28* (2013.01); *H04L 65/1006* (2013.01); *H04L 65/1016* (2013.01); *H04L 65/1069* (2013.01); *H04M 11/04* (2013.01); *H04W 8/08* (2013.01); *H04W 28/0226* (2013.01); *H04W 28/0247* (2013.01); *H04W 28/0268* (2013.01); *H04W 36/0061* (2013.01); *H04W 64/006* (2013.01); *H04W 72/0413* (2013.01); *H04W 72/0446* (2013.01); *H04W 76/00* (2013.01); *H04W 88/06* (2013.01); *H04W 92/02* (2013.01); *H04L 1/1607* (2013.01); *H04M 2242/04* (2013.01); *H04W 84/042* (2013.01); *H04W 84/12* (2013.01); *H04W 88/08* (2013.01)

(58) Field of Classification Search
USPC ........................................ 370/259
See application file for complete search history.

(56) References Cited

U.S. PATENT DOCUMENTS

| | | | | |
|---|---|---|---|---|
| 2006/0046697 | A1* | 3/2006 | Koren | H04W 4/10 455/412.2 |
| 2007/0218925 | A1* | 9/2007 | Islam | H04W 4/12 455/466 |
| 2007/0286234 | A1 | 12/2007 | Gutman et al. | |
| 2008/0311988 | A1* | 12/2008 | Smith | A63F 13/02 463/36 |
| 2010/0202368 | A1* | 8/2010 | Hans | H04M 3/5116 370/329 |
| 2011/0188416 | A1 | 8/2011 | Faccin et al. | |
| 2012/0257500 | A1* | 10/2012 | Lynch | H04L 47/52 370/235 |
| 2013/0003611 | A1* | 1/2013 | Hans | H04M 3/5116 370/259 |
| 2013/0143610 | A1 | 6/2013 | Jeong et al. | |
| 2014/0003354 | A1* | 1/2014 | Ekici | H04W 76/028 370/329 |
| 2015/0109965 | A1* | 4/2015 | Ayyalasomayajula | H04W 4/22 370/259 |
| 2015/0264548 | A1* | 9/2015 | Lee | H04W 4/22 370/335 |

OTHER PUBLICATIONS

"3rd Generation Partnership Project; Technical Specification Group Services and System Aspects; eCall Data Transfer; In-band modem solution; General description (Release 12)", 3GPP TS 26.267 V12. 0.0, (Dec. 2012), 36 pgs.

"3rd Generation Partnership Project; Technical Specification Group Services and System Aspects; IP Multimedia Subsystem (IMS) emergency sessions (Release 10)", 3GPP TS 23.167 V10.8,0, (Sep. 2013), 41 pgs.

"3rd Generation Partnership Project; Technical Specification Group Services and System Aspects; Service aspects; Service principles (Release 11)", 3GPP TS 22.101 V 11.9.0, (Jun. 2013), 66 pgs.

"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 28-32.

"International Application Serial No. PCT/US2014/057212, International Preliminary Report on Patentability mailed May 6, 2016", 7 pgs.

"International Application Serial No. PCT/US2014/057212, International Search Report mailed Jan. 16, 2015", 8 pgs.

"International Application Serial No. PCT/US2014/057212, Written Opinion mailed Jan. 16, 2015", 5 pgs.

"Internet Protocol-based In-Vehicle Emergency Call", ECRIT: Internet- Draft, [Online]. Retrieved from the Internet: <URL: https://tools.ietf.org/html/draft-rosen-ecrit-ecall-10>, (Jul. 14, 2013), 28 pgs.

Boonchai, Ngamwongwattana, "Effect of Packetization on VoIP Performance In: Electrical Engineering/Electronics, Computer", Telecommunications and Information Technology (ECTI-CON), 5th International Conference, vol. 1, (May 14-17, 2008), 373-376.

* cited by examiner

USER EQUIPMENT (UE) SUPPORTING PACKET-SWITCHED EMERGENCY CALLS OVER IP MULTIMEDIA SUBSYSTEM (IMS)

PRIORITY CLAIM

This application claims priority under 35 USC 119(e) to U.S. Provisional Patent Application Ser. No. 61/893,792, filed Oct. 21, 2013 which is incorporated herein by reference in its entirety.

TECHNICAL FIELD

Embodiments pertain to wireless communications. Some embodiments relate to emergency calls according to eCall. Some embodiments relate to packet-switched sessions over IP Multimedia Subsystem (IMS). Some embodiments relate to 3GPP networks. Some embodiments relate to In-Vehicle Systems (IVS).

BACKGROUND

Some networks may support emergency calls from mobile devices such as In-Vehicle Systems (IVS) or other devices. As an example, an emergency call may be made from a User Equipment (UE) operating on a 3GPP network. The emergency calls may be performed and initiated in response to an event, such as a car accident. In addition to voice communication, it may be desirable that the call support the sending of data from the IVS or UE to an emergency receiving station. For instance, emergency data generated by sensors or other devices in a vehicle may be communicated from the IVS as part of the emergency call, and may help to describe the severity or nature of an accident or the location of the vehicle.

The emergency data may include relatively small blocks of data that may need to be sent infrequently. Accordingly, the allocation of system resources, such as bandwidth, for purposes of sending the emergency data may be inefficient in some cases. As such, there are general needs for systems and methods for establishing and supporting communication sessions for emergency communication of voice and data.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device can be an In-Vehicle System (IVS) configured to support emergency communication according to protocols such as eCall. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Figure 1:
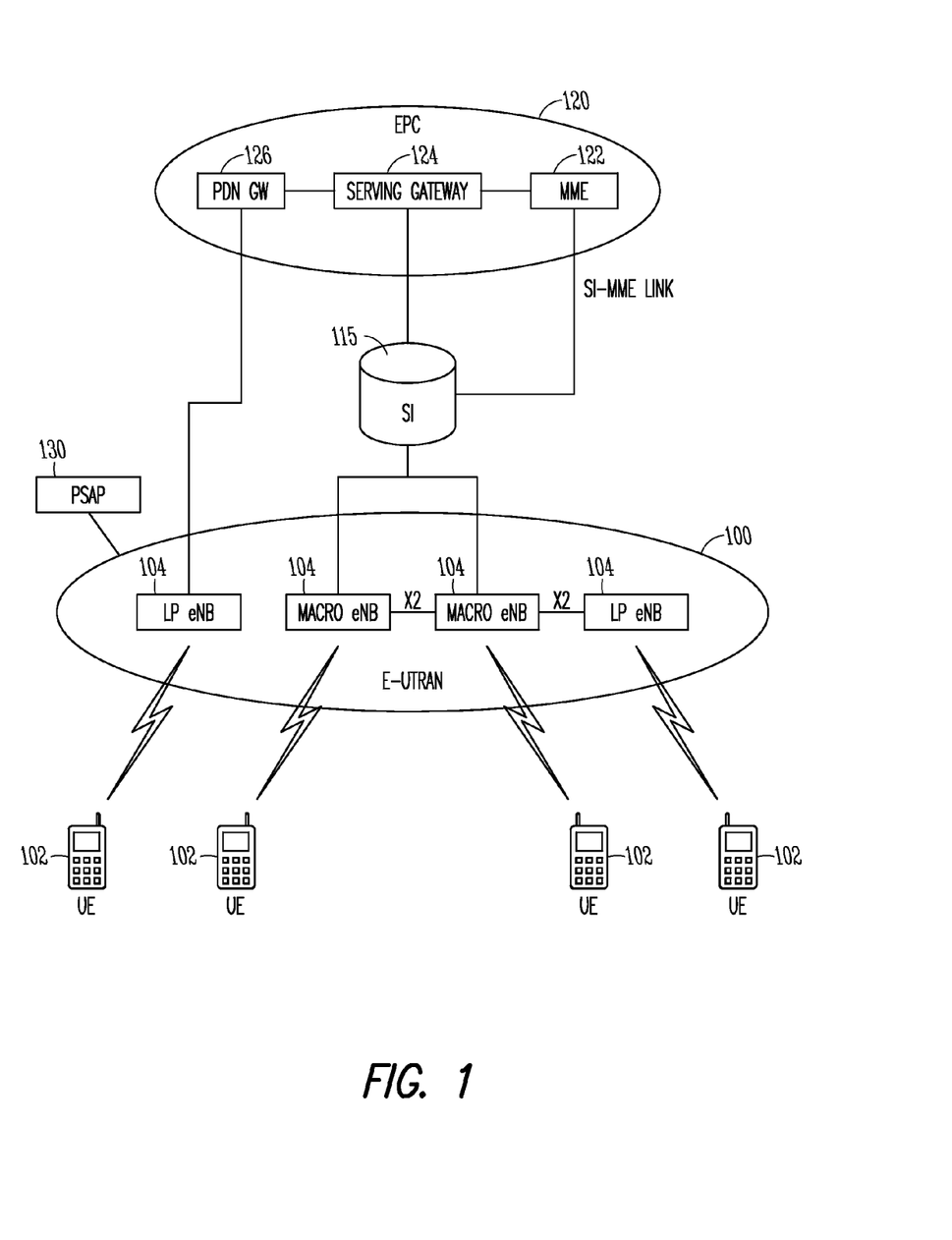
FIG. 1 is a functional diagram of a 3GPP network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes enhanced node B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

A Public Safety Answering Point (PSAP) 130 is also shown in FIG. 1, and may be communicatively coupled to the RAN 100, either through direct paths or through indirect paths which may include other components not shown. The PSAP 130 may be used in accordance with emergency communication sessions, and may or may not be part of the RAN 100 shown. As an example, the PSAP 130 may be located at an entity or company that serves as an answering service for emergency calls.

In some embodiments, a downlink resource grid may be used for downlink transmissions from an eNB 104 to a UE 102. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
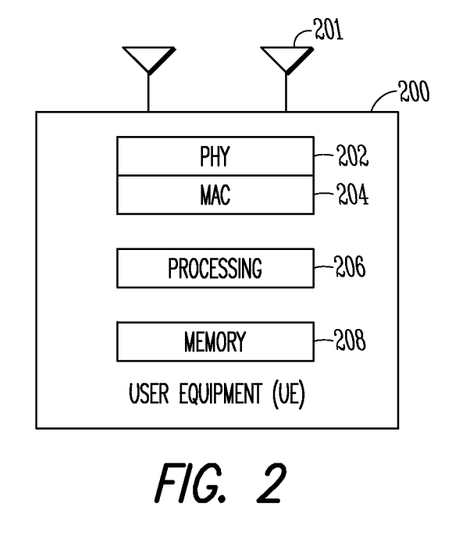
FIG. 2 is a functional diagram of a User Equipment (UE) in accordance with some embodiments.
Figure 3:
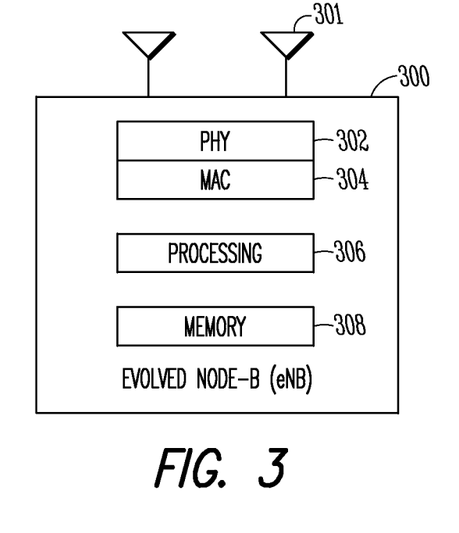
FIG. 3 is a functional diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 102 may be configured to support emergency calls in accordance with a 3GPP protocol and with eCall in an IP Multimedia Subsystem (IMS) session. The UE 102 may comprise hardware processing circuitry configured to transmit traffic packets to the eNB 104 for forwarding to a receiving station, which may be a Public Safety Answer Point (PSAP) 130. In some embodiments, the transmission of traffic packets during a packetization period may be restricted to one of transmission of voice packets or transmission of data packets. In some embodiments, at least some of the data packets may include Minimum Set of Emergency Related Data (MSD), and the IMS session may be configured in accordance with Real Time Transport Protocol (RTP). These embodiments are described in more detail below.

Communication sessions that operate according to eCall may support manually or automatically initiated emergency calls from an In-Vehicle System (IVS) or from another mobile device such as the UE 102. The calls may be initiated in response to an event, such as a car accident. The calls may be received at the PSAP 130 or at another location, and may be monitored or performed by persons associated with the PSAP 130. The sending of Minimum Set of Emergency Related Data (MSD) may be required for eCall, in addition to voice.

Figure 4:
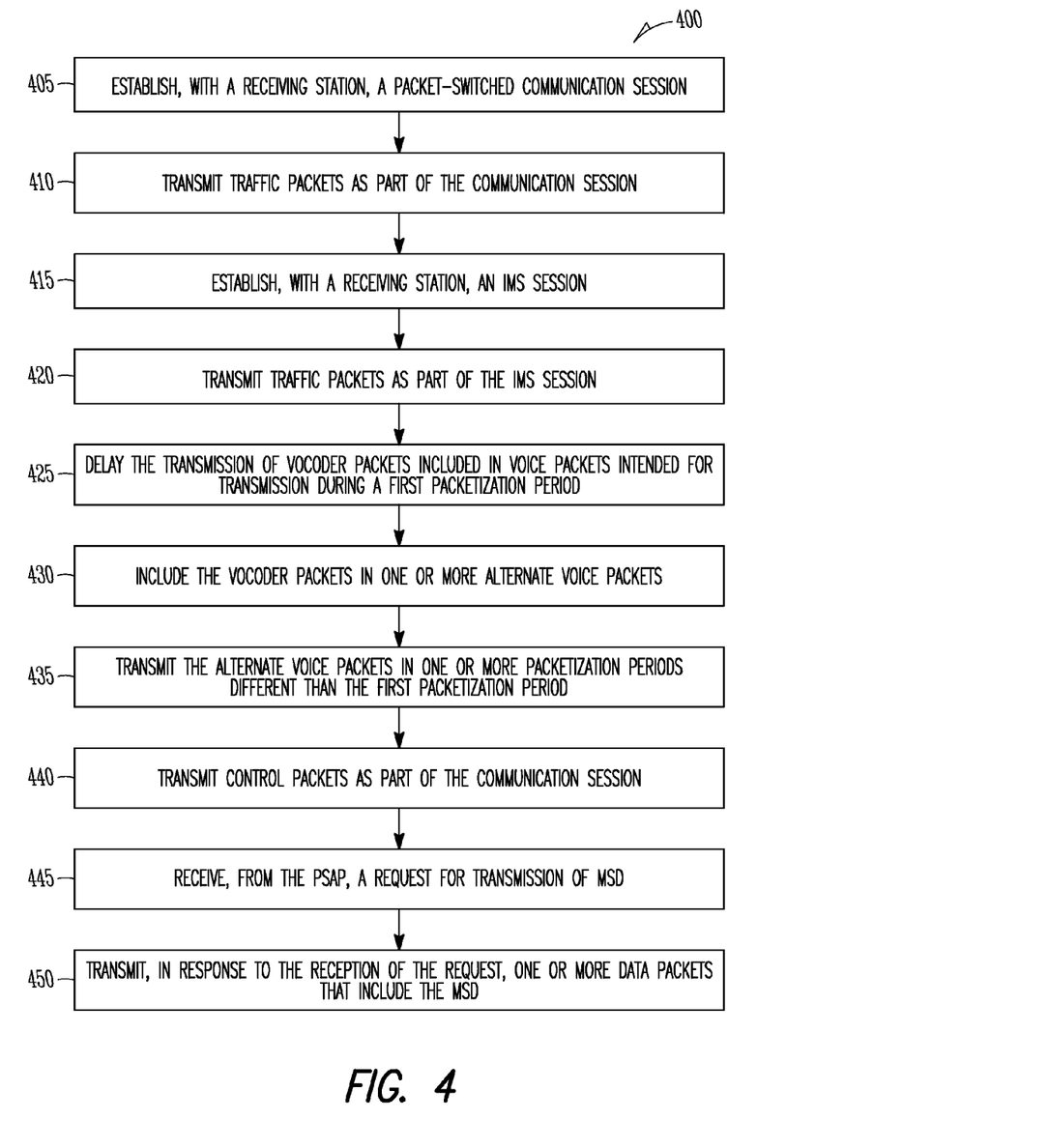
FIG. 4 illustrates the operation of a method for performing emergency communication sessions on a mobile device.

Referring to FIG. 4, a method 400 of supporting an emergency communication session is shown. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-8, although it is understood that the method 400 may be practiced with any other suitable systems, interfaces and components. In addition, while the method 400 and other methods described herein may refer to UEs 102 operating in accordance with 3GPP or other standards, embodiments of those methods are not limited to just those UEs 102 and may also be practiced on other mobile devices, such as an IVS. Moreover, the method 400 and other methods described herein may be practiced by wireless devices configured to operate in other suitable types of wireless communication systems, including systems configured to operate according to various IEEE standards such as IEEE 802.11. In addition, although the techniques or operations described may refer to "emergency communication sessions," it is understood that some or all of the techniques or operations may be applied to other non-emergency communication sessions.

At operation 405 of the method 400, a packet-switched communication session may be established with a receiving station, and at operation 410, traffic packets may be transmitted as part of the communication session. The communication session may be an emergency communication session in some embodiments, but is not limited as such. As an example, an emergency communication session may be initiated at a mobile device such as the UE 102 or at an In-Vehicle System (IVS), and may be initiated automatically in response to an event external to the UE 102, or a reception at the UE 102 of a notification of the occurrence of the event. As an example, the event may be a car accident and the notification may be sent from a device in the car, such as an airbag sensor. In that example, the UE 102 may automatically initiate the emergency communication session without any operations being performed by the user of the UE 102.

The communication session may support the sending of voice, and may also support the sending of data. As an example, a communication session operating according to eCall or another suitable protocol may require or support the sending of Minimum Set of Emergency Related Data (MSD). The MSD may include information from sensors in a vehicle that has been in an accident, location information, or any other suitable information that may be related to the mobile device or the accident. As part of the communication session, the data or the voice may be forwarded through the network to an emergency receiving station or other component, such as a Public Safety Answer Point (PSAP) 130. In some embodiments, the MSD data may be sent within four seconds of the transmission of the invite message, which may be performed as part of compliance with a requirement of eCall or another protocol. In some embodiments, the time requirement may be one second, and in some embodiments, the time requirement may be ten seconds. These embodiments are not limiting, however, as any suitable value for the time requirement may be used, and may be on the order of fractions of a second or several seconds or minutes.

In some embodiments, the voice and data may be transmitted by the UE 102 or IVS over a wireless channel to a base station or eNB 104, and may be forwarded on to the PSAP 130 or other component. It should be noted that the path over which the voice and data are forwarded may include any number of network or other components. The establishment of the communication session may be performed using any suitable protocol, including but not limited to Session Description Protocol (SDP). The establishment may include the communication of invite messages, acknowledgement messages, and other messages between the UE 102 or IVS and the PSAP 130 or other components, as known in the art. As previously described in relation to the voice and data packets, these messages may be communicated over direct or indirect paths in some cases, and the paths may include multiple components.

As part of the emergency communication session, the UE 102 or IVS may transmit traffic packets, which may include voice packets or data packets. In some embodiments, at least one voice packet and at least one data packet may be transmitted as part of the communication session. In some embodiments, the session may utilize Real Time Transport Protocol (RTP), but is not limited as such, and any suitable transport protocol may be used. In some embodiments, the session may be configured to send one or more traffic packets during a packetization period. The packetization periods may be contiguous in time and may be of uniform duration defined by a packetization interval. As an example, the packetization interval may be 20 msec. As another example, the packetization interval may 10 msec. These examples are not limiting, however, as any suitable value may be used for the packetization interval, and the value may be an industry standard or may be defined by a protocol such as RTP.

In some embodiments, the communication session may be configured such that data or voice packets may be sent during a packetization period while the sending of both data and voice packets during the packetization period may be restricted or not permitted. In some embodiments, the restriction may occur when an allocated data throughput for the communication session is less than a required data throughput for transmission of voice packets and data packets during the packetization period, but these embodiments are not limiting. The restriction may occur for any suitable reason or may be part of a protocol or standard. The allocated data throughput for the communication session may be negotiated as part of the establishment of the communication session, or may be specified, determined or changed before or during the communication session. The allocated data throughput may also be specified as part of a protocol or standard in some embodiments.

Figure 5:
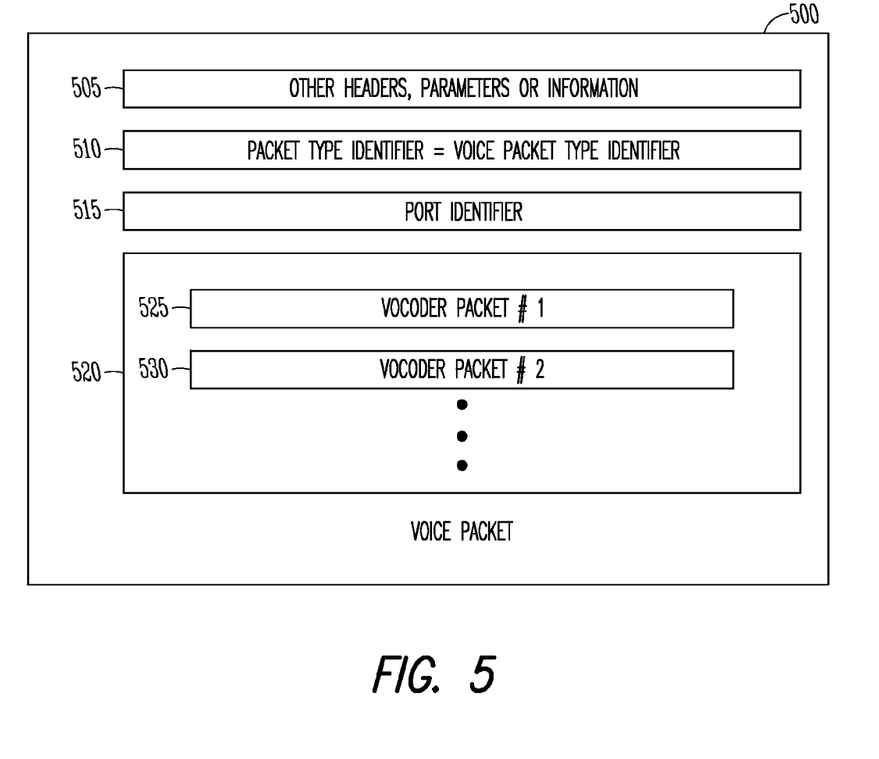
FIG. 5 illustrates an example of a voice packet in accordance with some embodiments.
Figure 6:
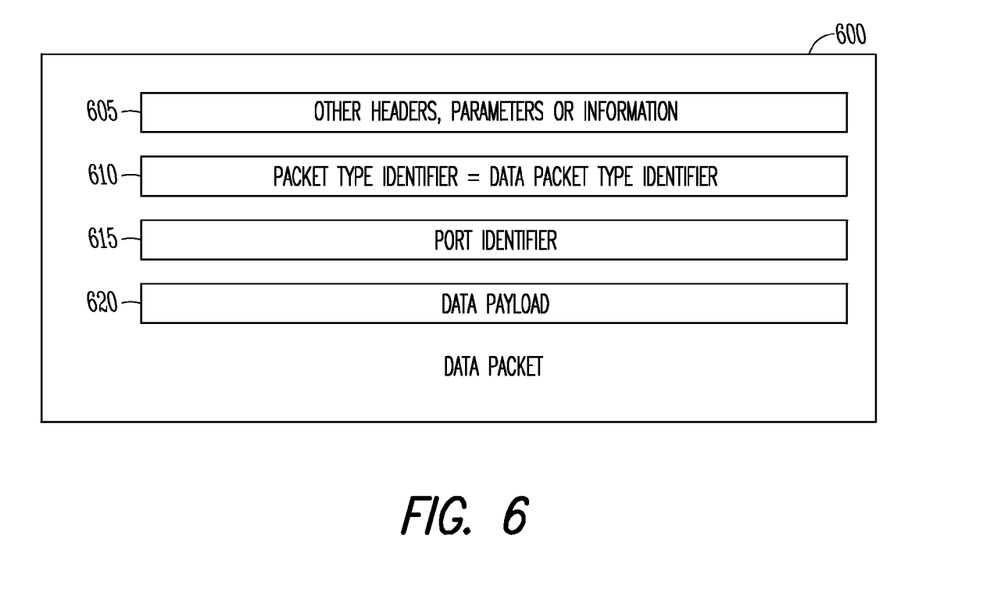
FIG. 6 illustrates an example of a data packet in accordance with some embodiments.

Non-limiting examples of traffic packets are shown in FIG. 5 and FIG. 6. The voice packet 500 may include other headers, parameters or information 505 that may or may not be related to the voice. As an example, the other headers may include an IP header, UDP header or TCP header. The voice packet 500 may also include a packet type identifier 510, which may take on values such as "voice" or other suitable description of the payload portion of the voice packet 500. In some embodiments, the packet type identifier 510 may be associated with RTP, and may be used to determine or differentiate if a received traffic packet includes voice or data. The port identifier 515 may also be associated with RTP, as known in the art. It should be noted that different communication sessions may utilize different port identifiers. For instance, a device may be in a mode in which it supports streaming video and voice at the same time in two different communication sessions, and traffic from the two different media streams may be specified by different port identifiers, although both media streams may use the same IP address. It should also be noted that the port identifier 515 may be included, in some embodiments, as part of one of the other headers 505.

In some embodiments, the voice payload 520 may include one or more vocoder packets 525, 530, but is not limited to the number of vocoder packets shown in FIG. 5. In some embodiments, the number of vocoder packets 525, 530 in each voice packet 500 may be a fixed number throughout the communication session. In some embodiments, that number may vary, especially due to the nature of packet-switched communication.

Referring to FIG. 6, an example of a data packet 600 is shown. As described in relation to the voice packet 500, the data packet 600 may include other headers, parameters or information 605 that may or may not be related to the data, and may include an IP header, UDP header or TCP header. The data packet 600 may also include a packet type identifier 610 as previously described, and the value of the packet type identifier 610 may be "data" or other suitable value that describes the data payload 620. The value of the packet type identifier 610 may be different than the value of the voice packet type identifier 510. As an example, in an RTP-based emergency communication session that supports the sending of both voice and data (such as the MSD), the packet type identifiers 510, 610 may indicate whether the traffic packet is a voice packet 500 or a data packet 600. Such a feature may be useful in a scenario in which voice is generally communicated throughout the session, and occasional data blocks must also be transmitted, but this scenario is not limiting.

The data packet 600 may also include a port identifier 615, which may be similar to or may play a similar role as the port identifier 515 previously described. In some embodiments of the emergency communication or other communication session, the port identifiers 515, 615 may be the same value. For instance, in the emergency communication session that supports the sending of voice and occasional blocks of data as part of a single media stream, the port identifiers 515, 615 may be associated with the stream and thus may have the same value. In that example, the packet type identifiers 510, 610 may serve to indicate whether or not the traffic packet includes voice payload 520 or data payload 620. That is, the packet type identifiers 510, 610 may indicate the type of packet, which may be voice or data in this case, or may be another type of packet in other scenarios. The data payload 620 may include MSD or other data, and may include a single block of MSD data, multiple blocks of MSD data or any portions thereof. As an example, a snapshot in time of values of a set of sensors may be combined with other information such as time or location to form a block of MSD data. As such, when only a portion of a block of MSD data is included in the data payload 620, multiple data packets 600 may need to be utilized to send the entire block. In some embodiments, a block of MSD data may be sent more than once. For example, repetition of the MSD data may offer improved reception performance through repetition diversity. As another example, when the MSD data is not received successfully at the PSAP 130, a negative acknowledgement or lack of a positive acknowledgement may lead to a retransmission of the MSD data.

It should be noted that the voice packets 500 and data packets 600 may also be used for communication from the PSAP 130 or other component to the UE 102 or IVS. Accordingly, the voice packet 500 may be used to send voice from the PSAP 130 to the UE 102, while the data packet 600 may be used for sending data from the PSAP 130 to the UE 102. As an example, the PSAP 130 may send an ACK message to the UE 102 that acknowledges successful reception of MSD data sent from the UE 102.

Figure 7:
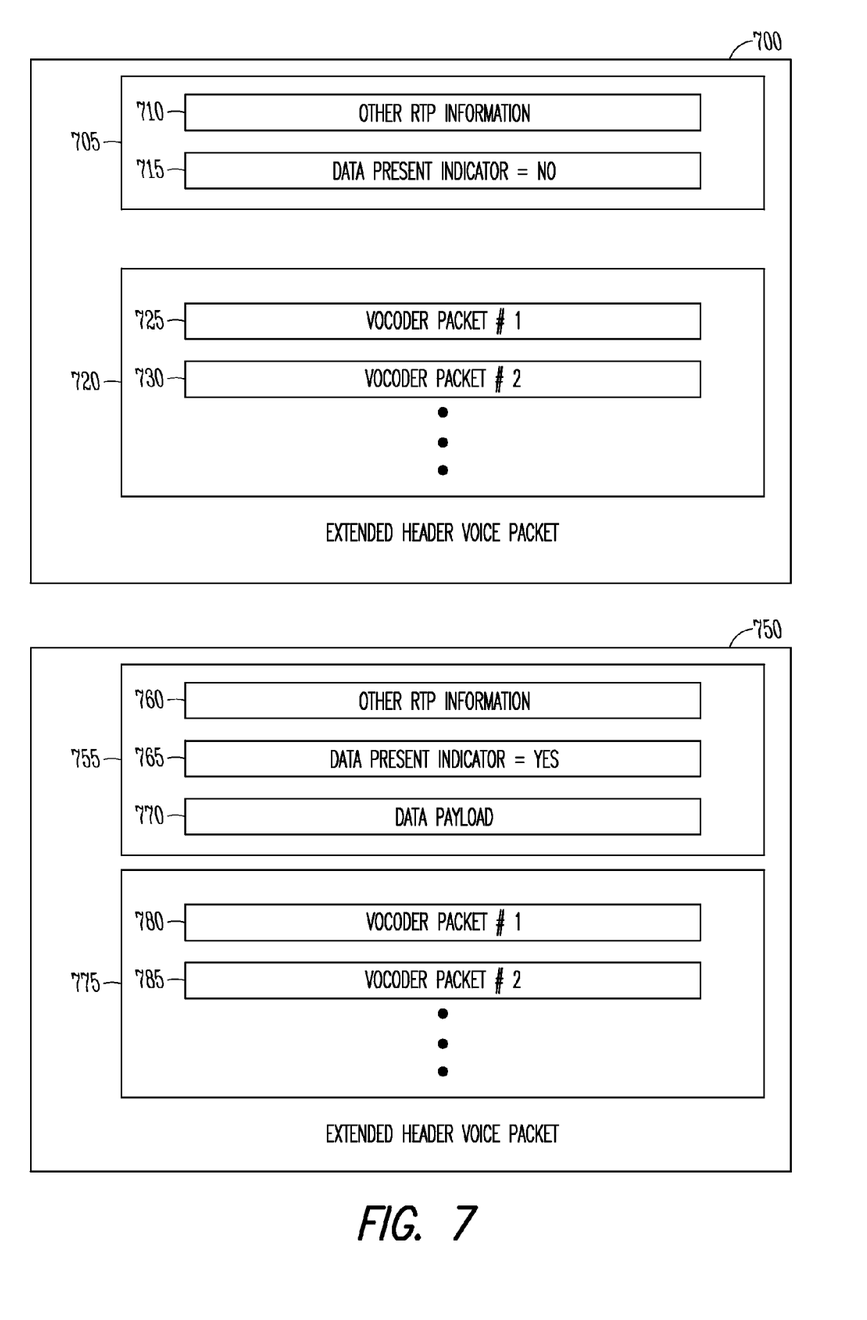
FIG. 7 illustrates examples of extended header voice packets in accordance with some embodiments.

In FIG. 7, examples of extended header voice packets 700 and 750 are shown. In some embodiments of the emergency communication session, the extended header voice packets 700 and 750 may be transmitted according to RTP. The extended header voice packets 700 and 750 may support the concept of header extension, as will be described below. It should be noted that although not shown, previously described other headers, parameters or information may be included in the extended header voice packets 700 and 750. The extended header voice packet 700 may include an RTP header 705, which may include RTP information 710 and a data present indicator 715, which is set to the value of "no" in the extended header voice packet 700 as shown. The data present indicator 715 may refer to whether or not the RTP header 705 includes a data payload, such as an MSD data block. The voice payload 720 may also be included in the extended header voice packet 700, and may include one or more vocoder packets 725, 730, as previously described.

The extended header voice packet 750 may include an RTP header 755, which may include RTP information 760 and a data present indicator 765, which is set to the value of "yes" in the extended header voice packet 750 as shown. It should be noted that the data present indicators 715, 765 are not limited to taking on the values of yes/no, as any suitable technique for indicating the presence or absence of a data payload may be used, including a Boolean variable or an enumerated value such as the length of the data payload 770. Accordingly, the value of "yes" or similar for the data present indicator 765 may indicate that the RTP header 755 includes the data payload 770, which may be a data block such as an MSD data block. In this case, the RTP header may be considered "extended." In addition to the RTP header 755, the extended header voice packet 750 may include a voice payload 775, which may include one or more vocoder packets 780, 785. The RTP header 755 may also include other indicators related to the data, such as its size, or other fields not shown. As a non-limiting example, the size of the data block may be 140 bytes. As another example, the size of the data may be 50 bytes. As another example, the size of the data may be 200 bytes.

In some embodiments that use the extended header voice packets 700, 750, the extended header voice packet 700 may be sent during packetization periods when there is no need to send data such as the MSD data. And when MSD or other data needs to be sent, the extended header voice packet 750 may be utilized, such that the voice may be sent uninterrupted while the transmission of MSD data, when necessary, can also be accommodated. In some embodiments, as part of the communication session, at least one extended header voice packet 700 may be transmitted and at least one extended header voice packet 750 may be transmitted.

It should be noted that the extended header voice packets 700 and 750 may also be used for communication from the PSAP 130 or other component to the UE 102 or IVS. Accordingly, the extended header voice packet 750 may be used for sending MSD data from the UE 102, and may be used for sending an ACK of the MSD data from the PSAP 130 to the UE 102.

It should be noted that in some cases, the PSAP 130 or other component may be incapable of or unwilling to support the use of extended header voice packets 700, 750 in the emergency communication session. In some embodiments, the emergency communication session in such cases may proceed in response with previously described techniques related to the use of voice packets 500 and data packets 600. That is, the UE 102 or IVS may initially request that the emergency communication session use the extended header voice packets 700, 750. If the request is denied or not accepted, the emergency communication session may use voice packets 500 and data packets 600, which may be a default scenario in some cases. The exchanging of such requests and other configuration messages may be part of a negotiation procedure, as known in the art. As an example, the request may be included as part of an invite message sent from the UE 102 or IVS.

Figure 8:
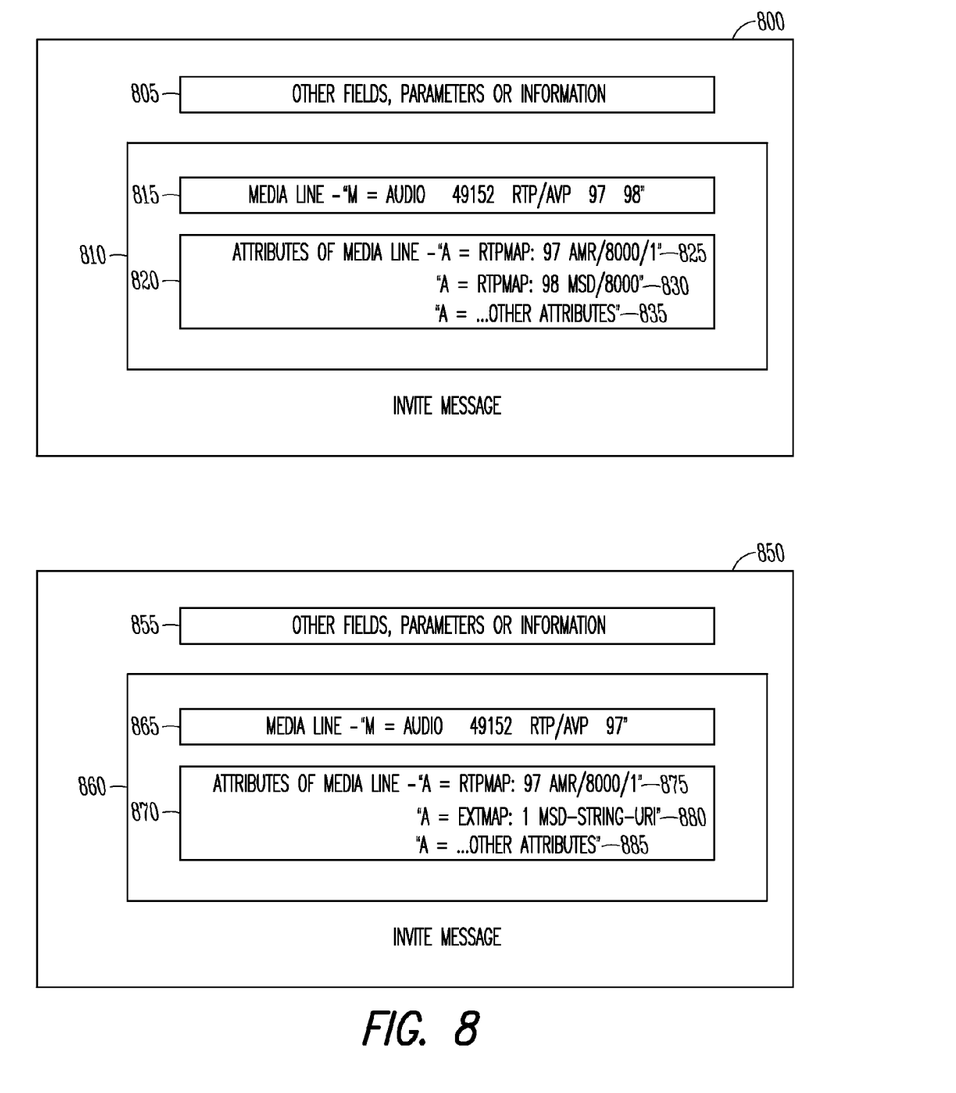
FIG. 8 illustrates examples of invite messages in accordance with some embodiments.

Example invite messages 800, 850 are shown in FIG. 8. The invite message 800 may be used to negotiate, or propose, the use of both voice packets 500 and data packets 600, and may include other fields, parameters or information 805 that may or may not be related to the emergency communication session. The media line information block 810 may include a media line identifier 815 that describes the media line (communication session) requested, including the fact that the media line is to support audio over RTP. The identifier 815 may also include a port identifier (49152 in this example), and two packet type identifiers (97 and 98 in this example) to be supported. It should be noted that the port identifier and packet type identifiers here may play the role of the packet type identifiers 510, 610 and port identifiers 515, 615 described earlier. The attribute section 820 describes various attributes of the media line, which may include descriptions of the two packet types (97 and 98). Accordingly, the example specification in line 825 may describe the packet type 97 as a voice packet that uses an AMR vocoder with a sampling rate of 8000 Hz, as known in the art. The example specification in line 830 may describe the packet type 98 as MSD data, while other attributes may be specified in line 835.

The invite message 850 may be used to negotiate, or propose, the use of extended header voice packets 700, 750, and may include other fields, parameters or information 855 that may or may not be related to the emergency communication session. The media line information block 860 may include a media line identifier 865 that describes the media line, including the fact that the media line is to support audio over RTP. The identifier 865 may also include a port identifier (49152 in this example), and a packet type identifier (97 in this example) to be supported. The attribute section 870 may include the example specification in line 875 that describes the packet type 97 as a voice packet that uses an AMR vocoder with a sampling rate of 8000 Hz. The example specification in line 880 may further describe the fact that an extension header of the packet type 97 may support the inclusion of MSD data. Other attributes may be specified in line 885. Although the example invite messages 800 and 850 may serve to illustrate the concepts, they are certainly not limiting in content or in the ordering of the content.

It should be noted that embodiments are not limited to the logic flow described above. That is, the negotiation process is not limited to first requesting the use of extended header voice packets 700, 750, and defaulting to the use of voice packets 500 and data packets 600 if extended header voice packets 700, 750 are not supported. In some embodiments, the communication session may support some, none or all of the packet types described (500, 600, 700, 750) or others not described, and the negotiation process may be any suitable process that establishes which types of packets are supported in the session. As an example, the negotiation process may first attempt to establish a communication session that uses voice packets 500 and data packets 600.

Returning to the method 400, at operation 410, an IMS session may be established with the receiving station, and traffic packets may be transmitted as part of the IMS session at operation 420. It should be noted that these operations may be similar or analogous to the operations 405 and 410 previously described, and may utilize similar techniques.

At operation 425, the transmission of vocoder packets included in one or more voice packets intended for transmission during a first packetization period may be delayed. At operation 430, the vocoder packets may be included in one or more alternate voice packets. At operation 435, the alternate voice packets may be transmitted in one or more packetization periods different than the first packetization period. In some embodiments, a voice packet may include a fixed number of vocoder packets, and a single voice packet may be sent during each packetization period. When a data packet must be sent, transmission of a voice packet intended for a first packetization period may be pre-empted in order to accommodate the sending of the data packet during the first packetization period. As such, in order for the voice communication to remain uninterrupted, the vocoder packets in the pre-empted voice packet may be included in another voice packet for transmission. As an example, the vocoder packets may be included in the next voice packet to be sent in the next packetization period, and may be included in addition to or in place of some or all of vocoder packets included in the next voice packet.

At operation 440, control packets may be transmitted as part of the communication session. In some embodiments, RTP may be employed in the session, and a corresponding control protocol such as RTP Control may also be utilized. As such, associated control packets may be sent as part of the communication session. In some embodiments, the transmission of traffic packets and control packets during the same packetization period may be permitted. In some embodiments, such transmission may be restricted or not permitted.

At operation 445, a request for transmission of MSD may be received from the PSAP 130, and in response to the reception of the request, one or more data packets that include MSD may be transmitted at operation 450. It should be noted that the PSAP 130 may send the request to the UE 102 or IVS through direct or indirect paths. The indirect path may include, in some embodiments, the eNB 104 or other components. The request for MSD transmission may be performed at regular intervals, but is not limited as such, as the MSD transmission may be requested for any suitable reason. The request may also be performed in response to a failure to successfully receive the MSD at the PSAP 130. The MSD data transmitted may be a new snapshot in time of MSD data, as previously described, or may be an older version that may have already been transmitted.

A mobile device configured to support packet-switched communication is disclosed herein. The mobile device may comprise hardware processing circuitry configured to establish, with a receiving station, a packet-switched communication session that enables transmission of traffic packets according to a packetization period. The hardware processing circuitry may be further configured to transmit traffic packets, including at least one voice packet and at least one data packet, as part of the communication session. In some embodiments, the transmission of traffic packets during the packetization period may be restricted to one of transmission of voice packets or transmission of data packets. In some embodiments, the restriction to one of transmission of voice packets or transmission of data packets may occur when an allocated data throughput for the communication session is less than a required data throughput for transmission of voice packets and data packets during the packetization period.

In some embodiments, the voice packets may include one or more vocoder packets. The hardware processing circuitry may be further configured to, for a first packetization period in which a transmission of data packets occurs, delay the transmission of vocoder packets included in voice packets intended for transmission during the first packetization period. The hardware processing circuitry may be further configured to, for the first packetization period, include the vocoder packets in one or more alternate voice packets and to transmit the alternate voice packets in one or more packetization periods different than the first packetization period.

The hardware processing circuitry may be further configured to transmit control packets as part of the communication session. In some embodiments, during at least one of the packetization periods, the transmission of traffic packets and the transmission of control packets may both occur. In some embodiments, during each packetization period, the transmission of traffic packets and the transmission of control packets may not be permitted. In some embodiments, the packetization periods may be contiguous in time and may be of uniform duration defined by a packetization interval. In some embodiments, the communication session may be configured in accordance with Real Time Transport Protocol (RTP). In some embodiments, the voice packets may include a voice payload, a voice packet type identifier, and a port identifier associated with the communication session, and the data packets may include a data payload, a data packet type identifier, and the port identifier.

In some embodiments, the mobile device may be a User Equipment (UE) configured to operate according to a 3GPP protocol, the communication session may be an emergency call in accordance with eCall, and at least some of the data packets may include Minimum Set of Emergency Related Data (MSD). In some embodiments, the mobile device may be an In-Vehicle-System (IVS), the communication session may be an emergency call in accordance with eCall, the receiving station may be a Public Safety Answer Point (PSAP), and at least some of the data packets may include Minimum Set of Emergency Related Data (MSD).

The hardware processing circuitry may be further configured to receive, from the PSAP, a request for transmission of MSD and to transmit, in response to the reception of the request, one or more data packets that include the MSD. In some embodiments, the establishment of the packet-switched communication session may be initiated automatically in response to a reception of a notification at the mobile device of an occurrence of an event external to the mobile device. In some embodiments, the establishment of the packet-switched communication session may include a transmission of an invite message receivable by the receiving station that enables a request for the establishment of the communication session. In some embodiments, the transmission of traffic packets may include transmission of at least one data packet that includes MSD within four seconds of the transmission of the invite message. In some embodiments, the establishment of the communication session may be performed according to a Session Description Protocol (SDP).

A mobile device configured to support packet-switched communication with a receiving station is disclosed herein. The mobile device may comprise hardware processing circuitry configured to transmit, according to a packetization period, extended header voice packets as part of a packet-switched communication session. In some embodiments, the extended header voice packets may include a voice payload and a voice packet header. In some embodiments, the voice packet headers may include a data present indicator that refers to the presence of a data payload in the voice packet header. In some embodiments, the voice packet header in at least one of the extended header voice packets transmitted as part of the communication session may include a data payload. The hardware processing circuitry may be further configured to transmit an invite message receivable by the receiving station that includes a request for support of extended header voice packets as part of the communication session. In some embodiments, the transmission of extended header voice packets may occur in response to an acceptance, at the receiving station, of the request for support of extended header voice packets. The hardware processing circuitry may be further configured to transmit, according to the packetization period, voice packets and data packets as part of the communication session, wherein the data packets include a data payload. In some embodiments, the transmission of voice packets and data packets may occur in response to a rejection, at the receiving station, of the request for support of extended header voice packets.

In some embodiments, the mobile device may be a User Equipment (UE) configured to operate according to a 3GPP protocol, the communication session may be an emergency call in accordance with eCall, and at least some of the data payloads may include Minimum Set of Emergency Related Data (MSD). In some embodiments, the mobile device may be an In-Vehicle-System (IVS), the communication session may be an emergency call in accordance with eCall, the receiving station may be a Public Safety Answer Point (PSAP), and at least some of the data payloads may include Minimum Set of Emergency Related Data (MSD).

A User Equipment (UE) configured to operate according to a 3GPP protocol is disclosed herein. The UE may be further configured to support emergency calls over IP Multimedia Subsystem (IMS) in accordance with eCall. The UE may comprise hardware processing circuitry configured to establish, with a receiving station, an IMS session that enables transmission of traffic packets according to a packetization period. The hardware processing circuitry may be further configured to transmit, as part of the IMS session, traffic packets to an Evolved Node-B (eNB) for forwarding to the receiving station. In some embodiments, the transmission of the traffic packets as part of the IMS session may include transmission of at least one voice packet and transmission of at least one data packet. In some embodiments, the transmission of traffic packets during the packetization period may be restricted to one of transmission of voice packets or transmission of data packets. In some embodiments, at least some of the data packets may include Minimum Set of Emergency Related Data (MSD).

In some embodiments, the IMS session may be configured in accordance with Real Time Transport Protocol (RTP) and the establishment of the IMS session may be performed according to a Session Description Protocol (SDP). In some embodiments, the establishment of the IMS session may be initiated automatically in response to a reception of a notification at the UE of an occurrence of an event external to the UE.

A non-transitory computer-readable storage medium that stores instructions for execution by one or more processors to perform operations for supporting a packet-switched communication session is disclosed herein. The operations may configure the one or more processors to establish, with a receiving station, a packet-switched communication session that enables transmission of traffic packets according to a packetization period and to transmit traffic packets, including at least one voice packet and at least one data packet, as part of the communication session. In some embodiments, the transmission of traffic packets during the packetization period may be restricted to one of transmission of voice packets or transmission of data packets.

In some embodiments, the communication session may be configured in accordance with Real Time Transport Protocol (RTP). In some embodiments, the voice packets may include a voice payload, a voice packet type identifier, and a port identifier associated with the communication session, and the data packets may include a data payload, a data packet type identifier, and the port identifier. In some embodiments, the communication session may be an emergency call in accordance with eCall, the mobile device may be a User Equipment (UE) configured to operate according to a 3GPP protocol or an In-Vehicle-System (IVS). In some embodiments, the receiving station may be a Public Safety Answer Point (PSAP) and at least some of the data packets may include Minimum Set of Emergency Related Data (MSD).

A method of exchanging voice and data packets over a packet-switched network between a mobile device and a receiving station is disclosed herein. The method may include establishing, with the receiving station, a packet-switched communication session that enables transmission of traffic packets according to a packetization period. The method may further include transmitting traffic packets, including at least one voice packet and at least one data packet, as part of the communication session. In some embodiments, the transmission of traffic packets during the packetization period may be restricted to one of transmission of voice packets or transmission of data packets. In some embodiments, the communication session may be configured in accordance with Real Time Transport Protocol (RTP).

In some embodiments, the voice packets may include a voice payload, a voice packet type identifier, and a port identifier associated with the communication session, and the data packets may include a data payload, a data packet type identifier, and the port identifier. In some embodiments, the communication session may be an emergency call in accordance with eCall and the mobile device may be a User Equipment (UE) configured to operate according to a 3GPP protocol or an In-Vehicle-System (IVS). In some embodiments, the receiving station may be a Public Safety Answer Point (PSAP) and at least some of the data packets may include Minimum Set of Emergency Related Data (MSD).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A mobile device configured to support packet-switched communication, the mobile device comprising:
a memory; and
hardware processing circuitry coupled with the memory and configured to:
establish, with a receiving station, an emergency packet-switched communication session that enables transmission of traffic packets within a plurality of packetization periods of the communication session, a plurality of the traffic packets transmitted during at least one of the packetization periods;
enable transmission within the communication session to include both data traffic and voice traffic packets; and
after transmission of at least one of each of the data traffic and voice traffic packets, restrict transmission within the at least one of the packetization periods of the communication session to one of data or voice packets, wherein restriction to one of transmission of voice packets or transmission of data packets occurs when an allocated data throughput for the communication session is less than a required data throughput for transmission of voice packets and data packets during the packetization period.

2. The mobile device according to claim 1, wherein:
the voice packets include one or more vocoder packets; and
the hardware processing circuitry is further configured to, for a first packetization period in which a transmission of data packets occurs:
delay the transmission of vocoder packets included in voice packets intended for transmission during the first packetization period;
include the vocoder packets in one or more alternate voice packets; and
transmit the alternate voice packets in one or more packetization periods different than the first packetization period.

3. The mobile device according to claim 2, wherein:
the vocoder packets are provided in an initial voice packet to be sent in a second packetization period immediately succeeding the first packetization period, and
the vocoder packets one or supplement or supplant at least some of vocoder packets to be transmitted in the initial voice packet.

4. The mobile device according to claim 1, wherein the hardware processing circuitry is further configured to:
transmit control packets as part of the communication session;
wherein during at least one of the packetization periods, the transmission of traffic packets and the transmission of control packets both occur.

5. The mobile device according to claim 1, wherein the hardware processing circuitry is further configured to:
transmit control packets as part of the communication session;
wherein during each packetization period, the transmission of traffic packets and the transmission of control packets within a same packetization period are not permitted.

6. The mobile device according to claim 1, wherein the packetization periods are contiguous in time and are of uniform duration defined by a packetization interval.

7. The mobile device according to claim 1, wherein the communication session is configured in accordance with Real Time Transport Protocol (RTP).

8. The mobile device according to claim 7, wherein:
the voice packets include a voice payload, a voice packet type identifier, and a port identifier associated with the communication session; and
the data packets include a data payload, a data packet type identifier, and the port identifier.

9. The mobile device according to claim 1, wherein:
the mobile device is a User Equipment (UE) configured to operate according to a 3GPP protocol;
the communication session is an emergency call in accordance with eCall; and
at least some of the data packets include Minimum Set of Emergency Related Data (MSD).

10. The mobile device according to claim 9, the hardware processing circuitry further configured to:
receive, from the PSAP, a request for transmission of MSD; and
transmit, in response to the reception of the request, one or more data packets that include the MSD.

11. The mobile device according to claim 1, wherein the establishment of the packet-switched communication session:
is initiated automatically in response to a reception of a notification at the mobile device of an occurrence of an event external to the mobile device; and
includes a transmission of an invite message receivable by the receiving station that enables a request for the establishment of the communication session.

12. The mobile device according to claim 11, wherein the transmission of traffic packets includes transmission of at least one data packet that includes MSD within four seconds of the transmission of the invite message.

13. The mobile device according to claim 1, wherein the establishment of the communication session is performed according to a Session Description Protocol (SDP).

14. The mobile device according to claim 1, wherein:
the allocated data throughput for the communication session is negotiated as part of the establishment of the communication session.

15. A mobile device configured to support packet switched communication with a receiving station, the mobile device comprising:
a memory; and
hardware processing circuitry coupled with the memory and configured to:
transmit, according to a packetization period, extended header voice packets as part of a packet-switched communication session, a plurality of packetization periods transmitted during the communication session;
wherein the extended header voice packets include a voice payload and a voice packet header;
wherein the voice packet headers include a data present indicator that indicates whether a data payload is present in the voice packet header; and
wherein the voice packet header in at least one of the extended header voice packets transmitted as part of the communication session includes a data payload as indicated by the data present indicator of the at least one of the extended header voice packets.

16. The mobile device according to claim 15, wherein:
the hardware processing circuitry is further configured to transmit an invite message receivable by the receiving station that includes a request for support of extended header voice packets as part of the communication session;
the transmission of extended header voice packets occurs in response to an acceptance, at the receiving station, of the request for support of extended header voice packets;
the hardware processing circuitry is further configured to transmit, according to the packetization period, voice packets and data packets as part of the communication session, wherein the data packets include a data payload; and
the transmission of voice packets and data packets occurs in response to a rejection, at the receiving station, of the request for support of extended header voice packets.

17. The mobile device according to claim 16, wherein the hardware processing circuitry is further configured to:
in response to the request being denied or not accepted, use voice packets and data packets in the communication session as a default.

18. The mobile device according to claim 15, wherein:
the mobile device is a User Equipment (UE) configured to operate according to a 3GPP protocol;
the communication session is an emergency call in accordance with eCall; and
at least some of the data payloads include Minimum Set of Emergency Related Data (MSD).

19. The mobile device according to claim 15, wherein:
the mobile device is an In-Vehicle-System (IVS);
the communication session is an emergency call in accordance with eCall;
the receiving station is a Public Safety Answer Point (PSAP); and
at least some of the data payloads include Minimum Set of Emergency Related Data (MSD).

20. A User Equipment (UE) configured to operate according to a 3GPP protocol, and further configured to support emergency calls over IP Multimedia Subsystem (IMS) in accordance with eCall, the UE comprising:
a memory; and
hardware processing circuitry coupled with the memory and configured to:
establish, with a receiving station, an IMS session that enables transmission of traffic packets within a plurality of packetization periods of the IMS session, a plurality of the traffic packets transmitted during at least one of the packetization periods;
enable transmission within the IMS session to include both data traffic and voice traffic packets, the transmission to an Evolved Node-B (eNB) for forwarding to the receiving station; and
after transmission of at least one of each of the data traffic and voice traffic packets, restrict transmission within the at least one of the packetization periods of the IMS session to one of data or voice packets, wherein restriction to one of transmission of voice packets or transmission of data packets occurs when an allocated data throughput for the IMS session is less than a required data throughput for transmission of voice packets and data packets during the packetization period;
wherein at least some of the data packets include Minimum Set of Emergency Related Data (MSD).

21. The UE according to claim 20, wherein the IMS session is configured in accordance with Real Time Transport Protocol (RTP) and the establishment of the IMS session is performed according to a Session Description Protocol (SDP).

22. The UE according to claim 20, wherein the establishment of the IMS session is initiated automatically in response to a reception of a notification at the UE of an occurrence of an event external to the UE.

23. A non-transitory computer-readable storage medium that stores instructions for execution by one or more processors to perform operations for supporting a packet-switched communication session, the operations to configure the one or more processors to:
establish, with a receiving station, an emergency packet-switched communication session that enables transmission of traffic packets within a plurality of packetization periods of the communication session, a plurality of the traffic packets transmitted during at least one of the packetization periods;
enable transmission within the communication session to include both data traffic and voice traffic packets;
after transmission of at least one of each of the data traffic and voice traffic packets, restrict transmission within the at least one of the packetization periods of the communication session to one of data or voice packets, wherein restriction to one of transmission of voice packets or transmission of data packets occurs when an allocated data throughput for the communication session is less than a required data throughput for transmission of voice packets and data packets during the packetization period.

24. The non-transitory computer-readable storage medium according to claim 23, wherein the communication session is configured in accordance with Real Time Transport Protocol (RTP).

25. The non-transitory computer-readable storage medium according to claim 24, wherein:
the voice packets include a voice payload, a voice packet type identifier, and a port identifier associated with the communication session; and
the data packets include a data payload, a data packet type identifier, and the port identifier.

26. The non-transitory computer-readable storage medium according to claim 23, wherein:
the communication session is an emergency call in accordance with eCall;
the mobile device is a User Equipment (UE) configured to operate according to a 3GPP protocol or an In-Vehicle-System (IVS);
the receiving station is a Public Safety Answer Point (PSAP); and
at least some of the data packets include Minimum Set of Emergency Related Data (MSD).

27. A method of exchanging voice and data packets over a packet-switched network between a mobile device and a receiving station, the method comprising:
establishing, with the receiving station, an emergency packet-switched communication session that enables transmission of traffic packets within a plurality of packetization periods of the communication session, a plurality of the traffic packets transmitted during at least one of the packetization periods;
enabling transmission within the communication session to include both data traffic and voice traffic packets; and
after transmission of at least one of each of the data traffic and voice traffic packets, restricting transmission within the at least one of the packetization periods of the communication session to one of data or voice packets, wherein restriction to one of transmission of voice packets or transmission of data packets occurs when an allocated data throughput for the communication session is less than a required data throughput for transmission of voice packets and data packets during the packetization period.

28. The method according to claim 27, wherein the communication session is configured in accordance with Real Time Transport Protocol (RTP).

29. The method according to claim 28, wherein:
the voice packets include a voice payload, a voice packet type identifier, and a port identifier associated with the communication session; and
the data packets include a data payload, a data packet type identifier, and the port identifier.

30. The method according to claim 27, wherein:
the communication session is an emergency call in accordance with eCall;
the mobile device is a User Equipment (UE) configured to operate according to a 3GPP protocol or an In-Vehicle-System (IVS);

the receiving station is a Public Safety Answer Point (PSAP); and at least some of the data packets include Minimum Set of Emergency Related Data (MSD).

* * * * *